Figure 1:
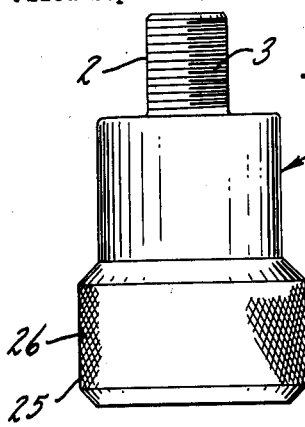
Figure 1:

May 3, 1966  H. L. DOBRIKIN  3,249,144
TIRE PRESSURE SYSTEM AND VALVE
Filed Sept. 23, 1964  2 Sheets-Sheet 1

INVENTOR.
Harold L. Dobrikin,
BY Parker & Carter
Attorneys.

United States Patent Office 3,249,144
Patented May 3, 1966

3,249,144
TIRE PRESSURE SYSTEM AND VALVE
Harold L. Dobrikin, Highland Park, Ill., assignor, by mesne assignments, to Berg Mfg. & Sales Co., Des Plaines, Ill., a corporation of Illinois
Filed Sept. 23, 1964, Ser. No. 398,616
12 Claims. (Cl. 152—415)

This invention relates to valves and has particular relation to a valve usable in association with pneumatic tires, such as vehicle tires and the like.

One purpose of the invention is to provide a valve usable with a set of tires and effective to insure balancing of pressures between said tires.

Another purpose is to provide a valve usable with a plurality of tires and effective to preclude diminution of pressure in one of said tires below a predetermined value when another of said tires falls below said value.

Another purpose is to provide a tire pressure system effective to provide simultaneous filling or inflation of a pair of pneumatic tires, an automatic equalization of pressures in said tires in response to diminuation of pressure in one of said tires and an automatic retention of a predetermined pressure in one of said tires when the other of said tires is drained below said predetermined pressure.

Another purpose is to provide a valve which may be employed with a vehicle tire without modification of the tire.

Another purpose is to provide a valve automatically effective to balance pressures between a plurality of tires and to limit the diminution of pressure of a tire below a predetermined value.

In conventional truck-trailer combinations it is known to employ a set of dual wheels and tires. It is desirable that said tires be equally inflated so as to wear equally and to provide the smoothest most balanced ride. Should one of said tires be inflated to a pressure less than the other of said tires, the tire having the greater inflation is required to carry the major load. Similarly, one of said tires may be entirely deflated without the knowledge of the vehicle operator since the remaining tire precludes a flattening of the deflated tire visible to the eye. While it is desirable to maintain equalized pressures in both of said tires in said set, it is not desirable to cause an otherwise good tire to become flat in response to the complete deflation of one of said tires. At the same time, it is equally undesirable to permit the fact of deflation of one tire and the resultant disposition of the entire load on the remaining tire to go unnoticed for any length of time. Accordingly, it is one purpose of the invention to provide a valve structure automatically effective to provide equalization of pressures between adjacent tires in a set of dual tires and, at the same time, to preclude said equalization from producing the entire deflation of an otherwise good tire in response to the complete deflation of its adjacent tire.

Other purposes will appear from time to time during the course of the specification and claims.

Figure 2:
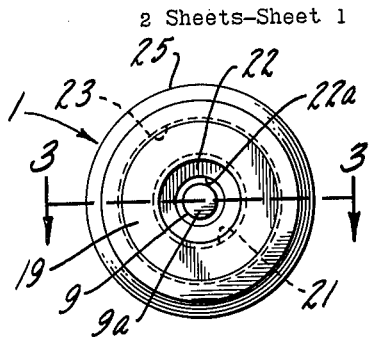
Figure 2:
Figure 3:
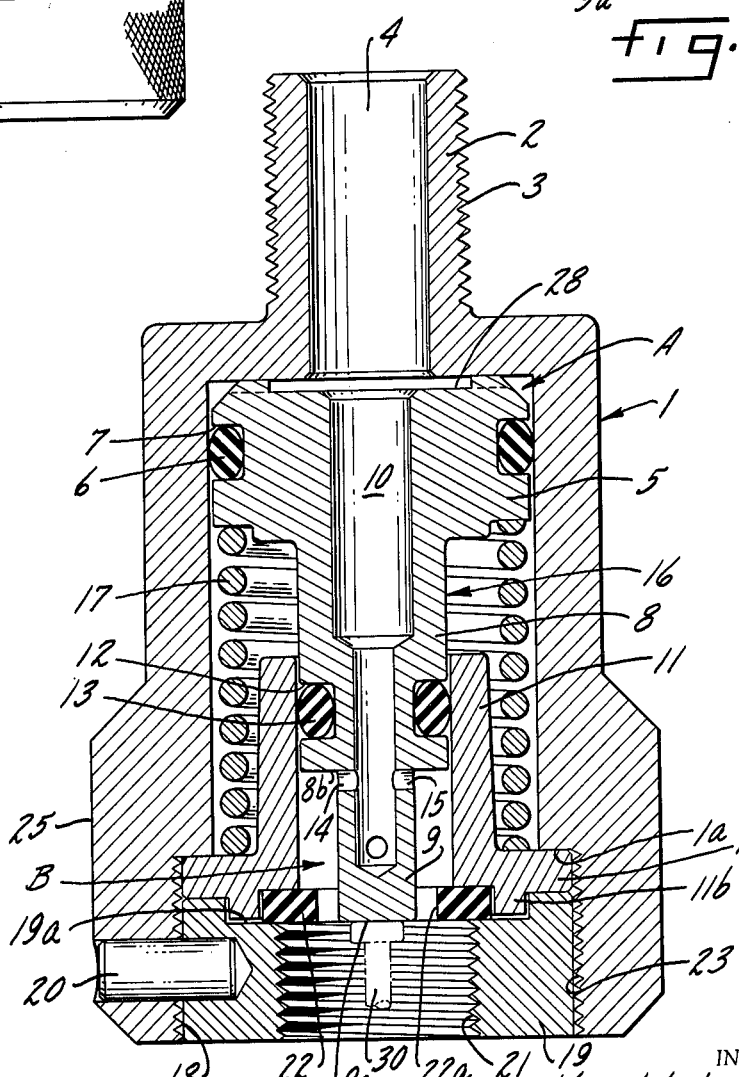
Figure 4:
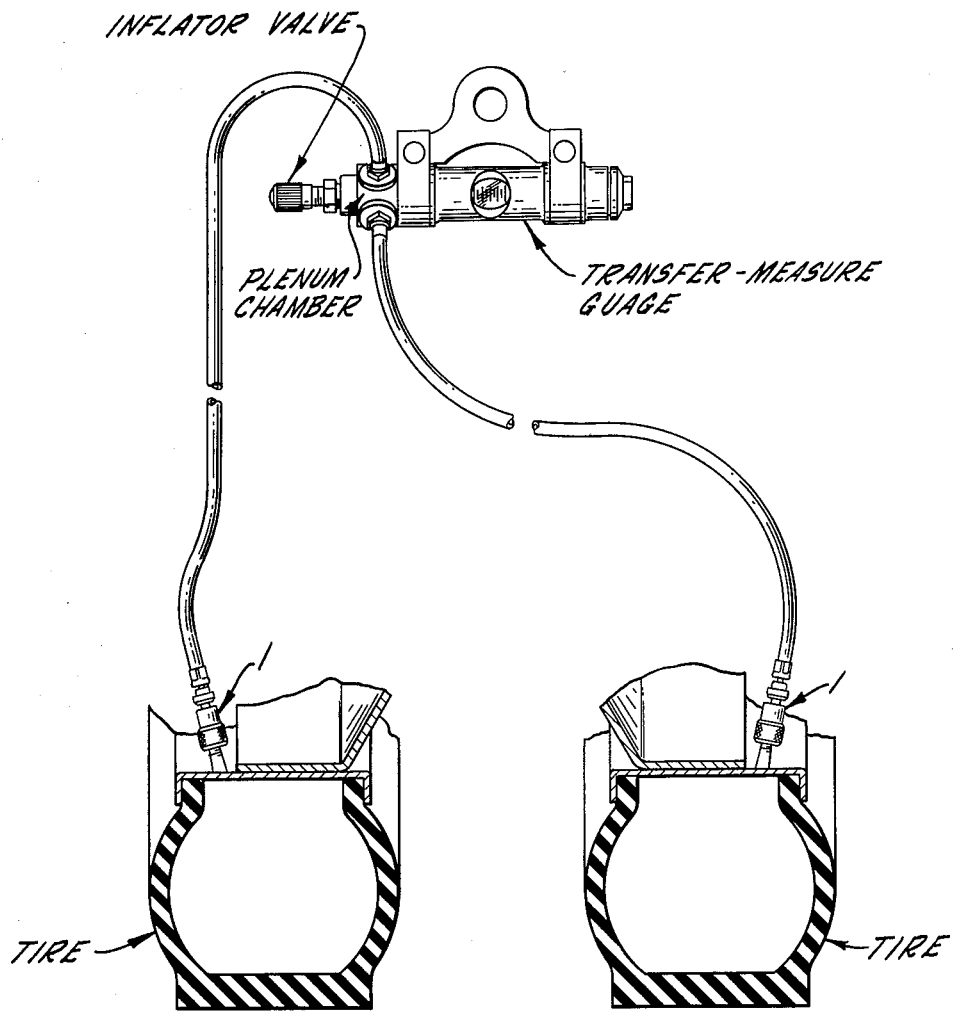

The invention is illustrated more or less diagrammatically in the accompanying drawings, wherein:

FIGURE 1 is a side elevation;
FIGURE 2 is an end view of the device of FIGURE 1;
FIGURE 3 is a cross-sectional view taken on the line 3—3 of FIGURE 2 and on an enlarged scale; and
FIGURE 4 is a diagrammatic illustration of a system of the invention.

Like parts are indicated by like numerals throughout the specification and drawings.

Referring now to the drawings, and particularly to FIGURE 1, the numeral 1 generally illustrates a valve casing or housing. The casing 1 has an end extension 2 outwardly threaded, as indicated at 3, and internally bored to form a passage 4. Adjacent the extension 2 the housing 1 has an enlarged segment defining an internal chamber A in which a piston 5 is reciprocal, a seal 6 being carried by piston 5 within a circumferential groove 7 for sealing engagement with the wall of chamber A. Piston 5 has an elongated extension 8 of reduced diameter. The extension 8 in turn has a further extension 9 of a diameter reduced from that of extension 8. An axial passage 10 extends through piston 5 and extension 8 into extension 9 in axial alignment with said piston and extensions. A sleeve member 11 is positioned within housing 1 and surrounds extensions 8 and 9 and forming a second chamber B. Extension 8 has a circumferential groove 12 carrying seal 13 in sealing engagement with the inner wall of sleeve 11. Branch passages 14, 15 communicate passage 10 with chamber B within sleeve 11 below extension 8 as the parts are shown in the drawings. The valve piston member, including portions 5, 8 and 9, elements 6, 7, 12 and 13 and passages 10, 14 and 15, may be considered together as member 16. An annular flange portion 11a of sleeve 11 is seated against an outwardly offset surface 1a of housing 1. A spring 17 has one of its ends engaging the upper surface, as the parts are shown in the drawings, of flange 11a and its opposite end engaging an opposed surface of piston 5, the spring 17 surrounding sleeve 11.

The surface 1a of housing 1 defines the base of a well 18 formed in the opposite end of housing 1 from the extension 2 and outwardly open from said opposite end. A plug member 19 is seated within the well 18 and may be suitably held therein by a setscrew 20, for example. The plug 19 has an outwardly open internally threaded bore 21. The plug 19 has an offset portion 19a formed to receive a circumferential extension 11b of sleeve 11 and to clamp a gasket 22 against an inner annular surface of sleeve 11. It will be observed that the gasket 22 has a central aperture 22a through which the end extension 9 may extend for movement into the bore 21. A suitable spiral or threaded vent passage, such as that indicated at 23, may be arranged between plug 19 in housing 1 and between flange 11a in housing 1 to preclude the buildup of pressures in undesirable places such as, for example, in the area occupied by the spring 17, the mating of surface 1a with flange 11a being insufficient to provide a seal. The housing 1 has a further enlarged portion 25 at its end opposite that from the extension 2 and the outer circumferential surface of enlargement 25 may be knurled as indicated at 26.

Whereas there has been shown and described an operative form of the invention, it should be understood that this showing and description are to be taken in an illustrative or diagrammatic sense only. There are many modifications in and to the invention which will be apparent to those skilled in the art and which will fall within the scope and spirit of the invention.

The use and operation of the invention are as follows:

The valve of the invention may be easily attached to the filler neck of a pneumatic tire, the threaded bore 21 being formed and adapted for threadable engagement with said filler necks, the latter being of standard size and being externally threaded. As shown in dotted lines in FIGURE 3 at 30, such pneumatic tire filler necks include a valve stem which will be axially aligned with the member 16 of the invention and which will extend into housing 1 to the point indicated, i.e. substantially in contact with or immediately adjacent the end surface 9a of extension 9 when the device of the invention is fully installed on the pneumatic tire filler neck. It will be understood that the opposite end extension 2 is suitably connected to one end of an appropriate conduit, the opposite end of which is in communication with a second pneumatic tire.

The invention has been found particularly useful, for example, in association with a tire pressure measuring device which is also effective to provide both a pressure filling and a pressure transfer mechanism between a set of dual, adjacent tires on a vehicle such as a truck-trailer. For further understanding thereof, reference may be had to application, Serial No. 371,630, filed June 1, 1964, and to FIGURE 4 herein. The parts illustrated diagrammatically in FIGURE 4 are labelled to disclose a valve of FIGURES 1, 2 and 3 fitted to the filler neck of each tire in an adjacent set, each of said valves being in communication with a plenum chamber through an associated conduit, the plenum chamber having an inflator valve and a measure or gauge element also associated therewith.

When the tires are to be filled, pressure is thus delivered through said inflator valve, plenum chamber and conduit to the passage 4 in extension 2 of each valve. From passage 4 said pressure flows immediately into axially aligned passage 10 in member 16. From passage 10 said pressure flows outwardly through passages 14, 15 into chamber B. With the parts in the position shown in FIGURE 3, the valve stem 30 of a pneumatic tire filler neck valve is in the closed position and no pressure enters the tire to which the valve of the invention is attached. The combination of the pressure in chamber B acting against end surface 8b of extension 8 and the force of spring 17 is effective to retain member 16 in its uppermost position, as shown in FIGURE 3. As pressure increases, however, in passage 4, said pressure acts against the larger upper surface 28 of piston portion 5 to overcome the combined force of pressure in chamber B and spring 17 and to move member 16 within housing 1 or downwardly, as the parts are shown in FIGURE 3. As member 16 is thus moved the valve stem 30 of the pneumatic tire is moved toward and into an open position and thereupon fluid pressure flowing through passages 4, 10, 14 and 15 and through chamber B flows through opening 22a in gasket 22 and into the filler neck of the pneumatic tire which is secured within bore 21 and thus the tire is filled. When the pressure in the tire, and thus at inlet 4, rises above a predetermined level, say 50 pounds, the member 16 will thereafter remain in said "open" position. The same will be true, of course, with respect to the adjacent tire to which a valve of the invention is fitted.

Similarly, if pressure within a first tire to which a first valve of the invention is attached should be diminished below that desired, the excess of pressure in the adjacent tire to which a second valve of the invention is attached will flow into passage 4 of said first valve and the action above indicated will take place to equalize the pressure in the two tires. If, however, the pressure within said first tire falls below a given point, for example 50 pounds, said pressure flowing from said adjacent tire will be insufficient to retain the member 16 in its open position in the valve attached to said adjacent tire and thus pressure within said adjacent tire cannot be reduced below said 50 pounds. Since a pressure approximating 90 pounds is conventionally employed in the tires described, it will be realized that a substantial area of equalization may be provided while preserving safe driving conditions. The reduction of pressure in the "good" tire is sufficient, however, to provide visual evidence of the deflation of the other tire below the desired level. Since the gauge shown in FIGURE 4 is responsive to the pressure in the plenum chamber and in turn to the pressure in the conduit extending between valves 1 and since the valve 1 of the "good" tire is permitting communication of the "good" tire with said conduits and thus with said chamber, it will be realized that said gauge is effective at all times to provide a reading relating to the pressure in the lowest tire.

What is claimed is:

1. A tire pressure system including a plenum chamber, conduits communicating said chamber with a plurality of pneumatic tires, a valve in the distal end of each of said conduits and connected to one of said tires, each said valve having a member yieldingly urged toward a position closing communication through its associated conduit between its associated tire and said chamber, said member being movable in response to pressure flowing through said associated conduit above a predetermined level from said chamber toward its associated tire to a position opening said communication, said member being held in said last-named position by said pressure at said level.

2. A tire pressure system including a plenum chamber, conduits communicating said chamber with a plurality of pneumatic tires, a valve in the distal end of each of said conduits and connected to one of said tires, each said valve having a member yieldingly urged toward a position closing communication through its associated conduit between its associated tire and said chamber, said member being movable in response to pressure flowing above a predetermined level through its associated conduit from said chamber toward its associated tire to a position opening said communication, and a measuring gauge having an end portion exposed to and yieldingly urged toward said plenum chamber, said gauge being movable away from said chamber in response to pressure therein to record the pressure within said chamber and said conduits.

3. A tire pressure system including a plenum chamber, conduits communicating said chamber with a plurality of pneumatic tires, a valve in the distal end of each of said conduits and connected to one of said tires, each said valve having a member yieldingly urged toward a position closing communication through its associated conduit between its associated tire and said chamber, said member being movable in response to pressure flowing above a predetermined level from said chamber toward its associated tire to a position opening said communication, said member being automatically movable into said first position in response to diminution below said predetermined level of pressure between said plenum chamber and said valve, and a measuring gauge having an end portion exposed to and yieldingly urged toward said plenum chamber, said gauge being movable away from said chamber in response to pressure therein to record the pressure within said chamber and said conduits, and an inflator valve in communication with said plenum chamber.

4. For use with a pneumatic tire having a filler neck and a filler valve stem in said neck, a tire valve comprising a housing, an internally threaded outlet in said housing and formed and adapted for fitting onto said filler neck, an inlet in said housing, a valve in said housing between said inlet and outlet, means yieldingly urging said valve toward a first position wherein said valve permits said valve stem to assume its closed position, a passage through said valve, said passage communicating with said inlet and with said filler neck, said valve member being movable, in response to pressure entering said housing through said inlet above a predetermined level, into a second position against said stem to move said stem into its open position and to open communication between said inlet and the area within said tire, said valve being held in said second position so long as said pressure remains above said predetermined level, said valve being automatically movable into said first position in response to diminution of pressure within said inlet below said predetermined level.

5. For use with a pneumatic tire having a filler neck and a filler valve stem in said neck, a tire valve comprising a housing, an internaly threaded outlet in said housing and formed and adapted for fitting onto said filler neck, an inlet in said housing, a valve in said housing between said inlet and outlet, means yieldingly urging said valve toward a first position wherein said valve permits said valve stem to assume its closed position, said valve member being movable, in response to pressure entering said housing through said inlet above a predetermined level, into a second position against said stem to move said stem into its open position and to open communication between said inlet and the area within said tire, said valve being held in said second position so long as said pressure remains above said predetermined level, said valve being automatically movable into said first position in response to diminution of pressure within said inlet below said predetermined level.

6. For use with a pneumatic tire having a filler neck and a filler valve stem in said neck, a tire valve comprising a housing, an internally threaded outlet in said housing and formed and adapted for fitting onto said filler neck, an inlet in said housig, a valve in said housing between said inlet and outlet, means yieldingly urging said valve toward a first position wherein said valve permits said valve stem to assume its closed position, said valve member being movable, in response to pressure entering said housing through said inlet above a predetermined level, into a second position against said stem to move said stem into its open position and to open communication between said inlet and the area within said tire.

7. For use with a pneumatic tire having a filler neck and a filler valve stem in said neck, a tire valve comprising a housing, an internally threaded outlet in said housing and formed and adapted for fitting onto said filler neck, an inlet in said housing, a valve in said housing between said inlet and outlet, means yieldingly urging said valve toward a first position wherein said valve permits said valve stem to assume its closed position, a passage through said valve, said passage communicating with said inlet and with said filler neck, said valve member being movable, in response to pressure entering said housing through said inlet above a predetermined level, into a second position against said stem to move said stem into its open position and to open communication between said inlet and the area within said tire.

8. For use with a pneumatic tire having a filler neck and a filler valve stem in said neck, a tire valve comprising a housing, an internally threaded outlet in said housing and formed and adapted for fitting onto said filler neck, an inlet in said housing, a valve in said housing between said inlet and outlet, means yieldingly urging said valve toward a first position wherein said valve permits said valve stem to assume its closed position, said valve member being movable, in response to pressure entering said housing through said inlet above a predetermined level, into a second position against said stem to move said stem into its open position and to open communication between said inlet and the area within said tire, said valve being automatically movable into said first position in response to diminution of pressure within said inlet below said predetermined level.

9. For use with a pneumatic tire having a filler neck and a filler valve stem in said neck, a tire valve comprising a housing, an internally threaded outlet in said housing and formed and adapted for fitting onto said filler neck, an inlet in said housing, a valve in said housing between said inlet and outlet, means yieldingly urging said valve toward a first position wherein said valve permits said valve stem to assume its closed position, said valve member being movable, in response to pressure entering said housing through said inlet above a predetermined level, into a second position against said stem to move said stem into its open position and to open communication between said inlet and the area within said tire, said valve being held in said second position so long as said pressure remains above said predetermined level.

10. For use with a pneumatic tire having a filler neck and a filler valve stem in said neck, a tire valve comprising a housing, an internally threaded outlet in said housing and formed and adapted for fitting onto said filler neck, an inlet in said housing, a valve in said housing between said inlet and outlet, means yieldingly urging said valve toward a first position wherein said valve permits said valve stem to assume its closed position, a passage through said valve, said passage communicating with said inlet and with said filler neck, said valve member being movable, in response to pressure entering said housing through said inlet above a predetermined level, into a second position against said stem to move said stem into its open position and to open communication between said inlet and the area within said tire, said valve being automatically movable into said first position in response to diminution of pressure within said inlet below said predetermined level.

11. For use with a pneumatic tire having a filler neck and a filler valve stem in said neck, a tire valve comprising a housing, an internally threaded outlet in said housing and formed and adapted for fitting onto said filler neck, an inlet in said housing, a valve in said housing between said inlet and outlet, means yieldingly urging said valve toward a first position wherein said valve permits said valve stem to assume its closed position, a passage through said valve, said passage communicating with said inlet and with said filler neck, said valve member being movable, in response to pressure entering said housing through said inlet above a predetermined level, into a second position against said stem to move said stem into its open position and to open communication between said inlet and the area within said tire, said valve being held in said second position so long as said pressure remains above said predetermined level.

12. For use with a pneumatic tire having a filler neck and a filler valve stem in said neck, a tire valve comprising a housing, an internally threaded outlet in said housing and formed and adapted for fitting onto said filler neck, an inlet in said housing, a valve in said housing between said inlet and outlet, means yieldingly urging said valve toward a first position wherein said valve permits said valve stem to assume its closed position, a passage through said valve, said passage communicating with said inlet and with said filler neck, said valve member being movable, in response to pressure entering said housing through said inlet above a predetermined level, into a second position against said stem to move said stem into its open position and to open communication between said inlet and the area within said tire, said valve having a reduced portion exposed to said pressure beyond said passage to aid said yielding means when said pressure is below a predetermined level.

References Cited by the Examiner

UNITED STATES PATENTS

| | | | |
|---|---|---|---|
| 1,849,139 | 3/1932 | Denmire | 152—415 X |
| 2,789,617 | 4/1957 | Cardi | 152—415 |
| 3,037,544 | 6/1962 | Gouirand | 152—415 |
| 3,079,974 | 3/1963 | Cardi | 152—415 |

EUGENE G. BOTZ, *Primary Examiner.*

ARTHUR L. LA POINT, *Examiner.*

C. W. HAEFELE, *Assistant Examiner.*